United States Patent [19]

Okada et al.

[11] Patent Number: 5,043,899
[45] Date of Patent: Aug. 27, 1991

[54] SECONDARY AIR SUPPLY SYSTEM FOR INTERNAL COMBUSTION ENGINES

[75] Inventors: Tsuyoshi Okada, Niiza-shi, Kiyoshi Suzuki, Shiki Yoshiyasu Uchida, Niiza, Koichi Hikicki, Tokyo; Shinji Juman, 2-19-80, Chiyoda, Sakado, all of Japan

[73] Assignee: Honda Giken Kogyo Kabushiki Kaisha

[21] Appl. No.: 250,054

[22] Filed: Sep. 28, 1988

[30] Foreign Application Priority Data

Sep. 29, 1987 [JP] Japan .................................. 62-147492
Oct. 15, 1987 [JP] Japan .................................. 62-260660

[51] Int. Cl.$^5$ ...................... F02M 23/06; G06F 15/20
[52] U.S. Cl. ................. 364/431.04; 123/585
[58] Field of Search ............ 364/431.01, 431.03, 364/431.04, 431.05, 431.07, 431.08, 431.12; 123/585, 587, 588, 439, 327

[56] References Cited

U.S. PATENT DOCUMENTS

| | | | |
|---|---|---|---|
| 4,349,877 | 9/1982 | Oyama et al. | 123/439 |
| 4,572,141 | 2/1986 | Hasegawa et al. | 123/585 |
| 4,617,890 | 10/1986 | Kobayashi et al. | 123/585 |
| 4,648,374 | 3/1987 | Kobayashi et al. | 123/587 |
| 4,649,877 | 3/1987 | Yasuoka et al. | 123/585 |
| 4,675,135 | 6/1987 | Ransom | 123/327 |
| 4,681,075 | 7/1987 | Yamato et al. | 123/585 |
| 4,700,679 | 10/1987 | Otobe et al. | 123/585 |
| 4,725,955 | 2/1988 | Kobayashi et al. | 364/431.05 |
| 4,763,265 | 8/1988 | Kawanabe et al. | 364/431.04 |
| 4,788,954 | 12/1988 | Otobe et al. | 123/585 |
| 4,831,536 | 5/1989 | Yakuwa et al. | 364/431.03 |
| 4,873,641 | 10/1989 | Nagaishi et al. | 364/431.03 |

FOREIGN PATENT DOCUMENTS

0113250  6/1984  Japan .................................. 123/585

*Primary Examiner*—Parshotam S. Lall
*Assistant Examiner*—Michael Zanelli
*Attorney, Agent, or Firm*—Pollock, Vande Sande & Priddy

[57] ABSTRACT

A secondary air supply system for an internal combustion engine for suppressing combustion when a throttle valve is fully closed. A secondary air supply system is controlled with a microprocessor which controls other circuits such as the vehicle ignition circuit. Sensors provide outside air temperature data, internal pressure and engine rpm to the microprocessor. The microprocessor addresses the memory based on a computation including these sensed values. The memory in turn controls valves in a secondary air supply system.

8 Claims, 10 Drawing Sheets

| | <1450 | 1450~1550 | 1550~2000 | 2000~2500 | 2500~3000 | NE > 3000 |
|---|---|---|---|---|---|---|
| | - | o | - | o | - | o |
| | o | - | - | o | o | - |
| | o | o | o | - | - | - |

FIG.10

| PB < 460 | 460 ~ 500 | PB > 500 |
|---|---|---|
| - | o | - |
| o | - | - |

FIG.11

| TA < 5 | 5 < TA < 15 | TA > 15 |
|---|---|---|
| o | - | o |
| o | o | - |

TA < 5°C

| VALVE NO. | | | 1 | 2 | 3 | 1 | 2 | 3 | 1 | 2 | 3 | 1 | 2 | 3 |
|---|---|---|---|---|---|---|---|---|---|---|---|---|---|---|
| PB mmHg abs | BELOW 500 | | X | O | X | X | O | X | O | O | X | O | O | O |
| | ABOVE 500 | | X | X | X | X | X | X | O | O | X | O | X | O |
| NE (RPM) | | | ~1550 | | | 1550~2000 | | | 2000~3000 | | | 3000~ | | |

| VALVE NO. | | | 1 | 2 | 3 | 1 | 2 | 3 | 1 | 2 | 3 | 1 | 2 | 3 |
|---|---|---|---|---|---|---|---|---|---|---|---|---|---|---|
| PB mmHg abs | BELOW 500 | | X | X | O | (X | X | O) | O | X | O | O | O | O |
| | ABOVE 500 | | X | X | X | X | O | X | O | O | X | O | X | O |
| NE (RPM) | | | ~1550 | | | 1550~2000 | | | 2000~3000 | | | 3000~ | | |

| VALVE NO. | | | 1 | 2 | 3 | 1 | 2 | 3 | 1 | 2 | 3 | 1 | 2 | 3 |
|---|---|---|---|---|---|---|---|---|---|---|---|---|---|---|
| PB mmHg abs | BELOW 500 | | X | O | O | X | O | O | O | O | O | O | O | O |
| | ABOVE 500 | | X | X | X | X | O | X | O | O | X | O | X | O |
| NE (RPM) | | | ~1550 | | | 1550~2000 | | | 2000~3000 | | | 3000~ | | |

SECONDARY AIR SUPPLY SYSTEM FOR INTERNAL COMBUSTION ENGINES

FIELD OF THE INVENTION

The present invention relates to a secondary air supply system for internal combustion engines.

The present invention further relates to a control circuit for a vehicle, and more particularly to a vehicular control circuit wherein two or more kinds of controls for different control objects are performed by sharing a CPU.

BACKGROUND OF THE INVENTION

Usually, when the internal temperature of an internal combustion engine is high during operation, an air-fuel mixture burns easily under the conditions of a relatively low fuel concentration and a high pressure. At the time of start-up of the engine, and when the internal temperature of the engine is high, the mixture is easier to burn at a relatively high fuel concentration.

Consequently, when the throttle valve is brought into a fully closed state rapidly from its fully open state when internal temperature of the engine is high, there will be a rapid increase in negative pressure due to intake in the interior of the engine, which may cause misfiring.

To cope with the above problem, there is known a secondary air supply system which is used as an accessory for an internal combustion engine equipped with a so-called secondary air injection type exhaust gas purifying apparatus, such as the one disclosed in Japanese Utility Model Publication No. 8725/71.

The conventional supply system operates according to temperatures of exhaust gas, whereby upon an increase in negative pressure due to the intake in a fully closed throttle valve at a high engine temperature, secondary air is supplied into an intake pipe to prevent misfiring. At a low engine temperature, the supply of secondary air into the intake pipe is stopped even when the throttle valve is fulley closed, so that an air-fuel mixture having a high fuel concentration is supplied into the engine, thereby permitting quick start-up.

However, in such a supply system, when the engine brake is applied and the throttle valve assumes its fully close state, causing the negative pressure in the intake pipe to drop to a large extent, secondary air is temporarily supplied into the intake pipe as mentioned above to form, a dilute mixture of a low fuel concentration. The output-generating, state of the engine is continued temporarily, thus causing a delayed response to the engine brake.

Control circuits for a vehicle include, for example, an ignition control circuit for an internal combustion circuit and an air supply control circuit for the same engine. In the former, the ignition timing is determined on the basis of detected signals on vehicular running conditions such as engine speed and intake pipe internal pressure. An example is disclosed in Japanese Published Patent Application No. 85177/87, which discloses a control circuit having solenoid valve which is opened or closed in accordance with signals representing vehicular running conditions, such as engine speed and intake pipe pressure, plus an outside air temperature to control the supply of air so that good running characteristics are obtainable.

According to one conventional construction, a single CPU is used to effect plural controls. However, in a control circuit concerned with setting of a carburetor as in the foregoing circuits, considerable time is required for the setting and modification is made to a large extent until completion of the setting. This requires much time and labor for the preparation of a program, making its completion difficult.

SUMMARY OF THE INVENTION

In order to overcome this drawback, it is an object of the present invention to provide a secondary air supply system capable of suppressing the internal combustion of an internal combustion engine when a throttle valve is fully closed, and at a high engine temperature, thereby enhancing the braking effect of the engine brake.

It is a further object of the invention to reduce the number of duplicated components by sharing a CPU between two or more kinds of control circuits, thereby attaining a compact configuration and hence low cost for the control circuits, and further providing a vehicular control circuit capable of easily responding to changes in control values.

To this end, the present invention provides a secondary air supply system for internal combustion engines, including a secondary air one-shot air valve, air passages formed in parallel and downstream of the said air valve, and a solenoid valve which is closed when engine speed is below a predetermined rpm. When the engine speed is below a predetermined value of rpm, the solenoid valve which is disposed in an air passage is closed to reduce the sectional area of the passage. This decreases the amount of secondary air supplied from the secondary air one-shot air valve suppressing the deterioration of braking effect of an engine brake due to secondary air when the engine speed is close to the idling speed.

Also, according to the invention, the vehicle includes a first control circuit for driving a first control object in accordance with detected signals Ne, $P_B$ and $T_A$ representing running conditions of the vehicle such as engine speed, etc., and a second control circuit for driving a second control object different from the first control object in accordance with detected signals Ne, $P_B$ and $T_A$. The first control circuit is constituted by a microcomputer to drive the first control object. The detected signals Ne, $P_B$ and $T_A$ are coded by the microcomputer. The second control circuit is a code conversion circuit for converting a set of values $D_1$–$D_7$ of the detected signals Ne, $P_B$ and $T_A$ coded by the microcomputer into driving signals for the second control object.

A CPU can be shared and the second control circuit can be constituted by only a signal conversion circuit. Consequently, for example, a change of a control value for the second control object can be responded to by a change of only the signal conversion circuit, thus making it easy to cope with a design modification thereof.

BRIEF DESCRIPTION OF THE DRAWINGS

In order that the invention may be more clearly understood, reference will now be made to the accompanying drawings, wherein an embodiment of the invention is shown for purposes of illustration.

DESCRIPTION OF PREFERRED EMBODIMENT

Figure 1:
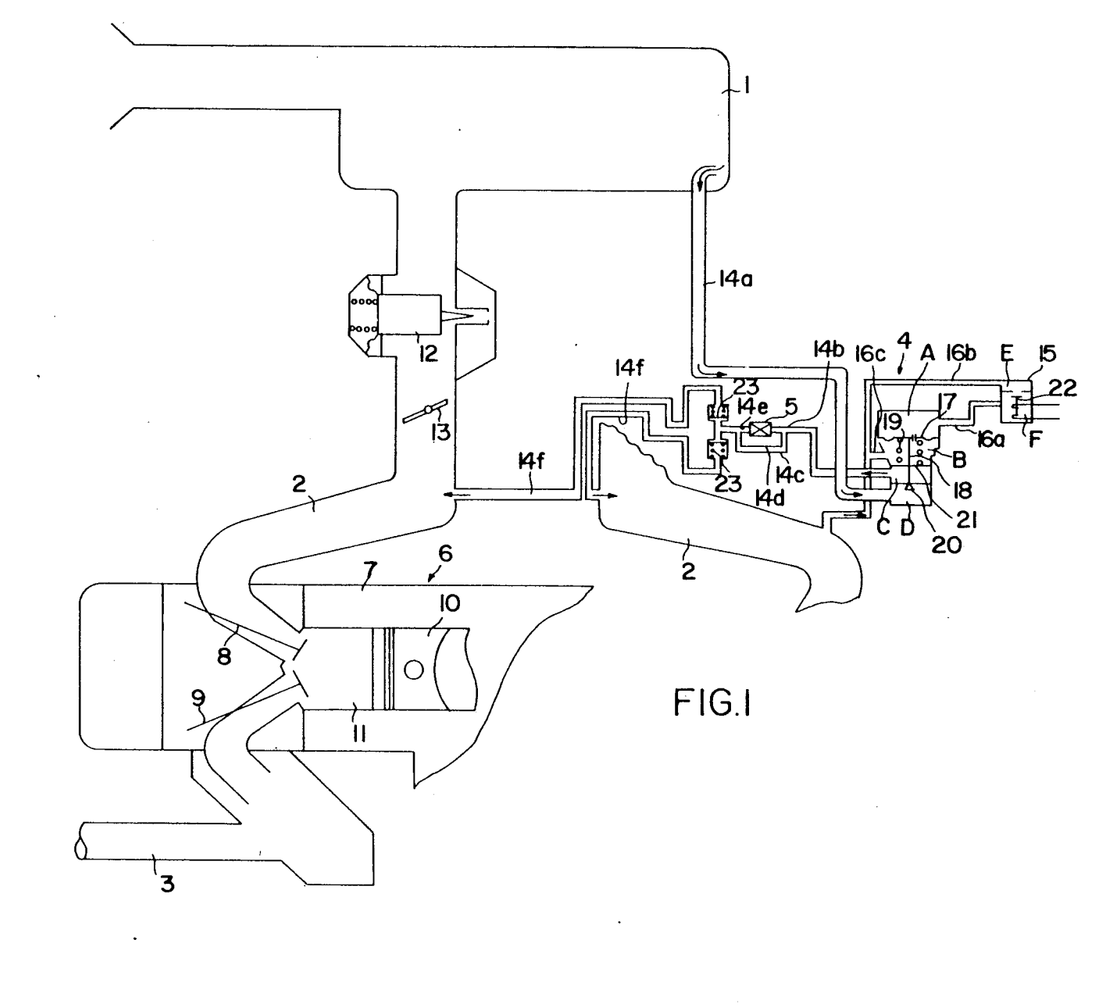
FIG. 1 is a schematic diagram illustrating a piping system of a secondary air injection type exhaust gas purifying apparatus and a secondary air supply system for internal combustion engines.

FIG. 1 shows an air cleaner 1, an intake pipe 2, an exhaust pipe 3, a secondary air one-shot air valve 4 and a solenoid valve 5. The air cleaner 1 is in communication with a pair of internal combustion engines 6 through intake pipes 2,2.

The internal combustion engines 6 are each provided with a cylinder 7, an intake valve 8, an exhaust valve 9 and a piston 10, with a combustion chamber 11 being defined by the cylinder 7, valves 8, 9 and piston 10.

The interior of each of the paired intake pipes 2 is provided with a carburetor 12; a throttle valve 13 is mounted in the intake pipe 2 below the carburetor 12 so that it can move in opening and closing directions.

The secondary air one-shot air valve 4 is in communication with the air cleaner 1 and the intake pipes 2 through pipes 14a and 14b, respectively, and with one intake pipe 2 through a negative pressure detector 15 and through pipes 16a, 16b and 16c.

In the secondary air one-shot air valve 4 there are provided a diaphragm 17 and a valve 20 which is moved vertically by the diaphragm through a support shaft 18 and a spring 19. Further, between the spring 19 and the valve 20 there is provided a partition wall 21 slidable so as to be responsive to the operation of the shaft 18. The air valve 4 is divided into chambers A, B, C and D by the diaphragm 17, partition wall 21 and valve 20. In the interior of the negative pressure detector 15, there is provided a solenoid valve 22 adapted to open upon turning ON of a neutral switch for detecting a neutral state wherein the vehicle engines 6 and a constituent gear of the transmission are not in engagement, to thereby establish communication between chambers E and F. When the neutral switch is OFF, the solenoid valve 22 is closed to cut off communication between the chambers E and F. The chamber C in the secondary air one-shot air valve 4 is connected to the communication pipe 14b located downstream, with the solenoid valve 5 being located in an intermediate position of the pipe 14b. The solenoid valve 5 is adapted to open and close according to predetermined numbers of revolutions of the engine 6 to control the supply of air from the air valve 4 to the intake pipes 2. Further, a bypass pipe 14c is disposed in parallel with the communication pipe 14b as a detour for the solenoid valve 5, the bypass pipe 14c being provided with an orifice 14d which is adjusted to let air pass therethrough in a smaller amount as compared with an orifice 14e provided downstream of the solenoid valve 5 in the communication pipe 14b.

Branching off downstream of the orifice 14e, there branch communication pipes 14f which are connected to the paired intake pipes 2 through one-way valves 23, respectively. The one-way valves 23 permit the passage of air only in the arrowed directions.

The operation of this embodiment will no be described.

Usually, during operation of each internal combustion engine, an air-fuel mixture which has been vaporized by the carburetor 12 passes through the intake pipe 2 via the throttle valve 13 and is fed to the combustion chamber 11 through the intake valve 8. At this time, if the throttle valve 13 is rapidly brought into its fully closed state, the interior of the intake pipe 2 will assume a state of negative pressure.

At this time, moreover, the solenoid valve 22 in the negative pressure detector 15 is in a position to isolate the chambers A and B in the secondary air one-shot air valve 4 from each other, so that the chamber B becomes negative in pressure through the pipe 16b. Since the chamber A is at normal pressure, the diaphragm 17 is pushed toward the chamber B due to the difference in pressure. At the same time, the valve 20 goes down, so that the chamber D in the air valve 4 and the pipe 14b enter into communication with each other. Consequently, the secondary air from the air cleaner 1 is supplied to the intake pipe 2 through the pipes 14a, 14b, 14d and 14f, which supply is stopped upon release of the negative pressure.

Principal components of this embodiment operate in the following manner. When the neutral switch is kept OFF, the solenoid valve 22 is closed and the secondary air one-shot air valve 4 is in a state capable of operating. When the number of revolutions of the engine 6 increases from below a predetermined value, say 1,925 rpm, to above a predetermined value, say 2,000 rpm, the solenoid valve 5 is in a closed state up to 2,000 rpm and opens at a larger number of revolutions. On the other hand, when the number of revolutions of the engine 6 decreases from above another predetermined number of revolutions, for example, 2,000 rpm, to below 1,925 rpm, the solenoid valve 5 is open down to 1,925 rpm and closes as the engine speed further decreases.

Figure 2:
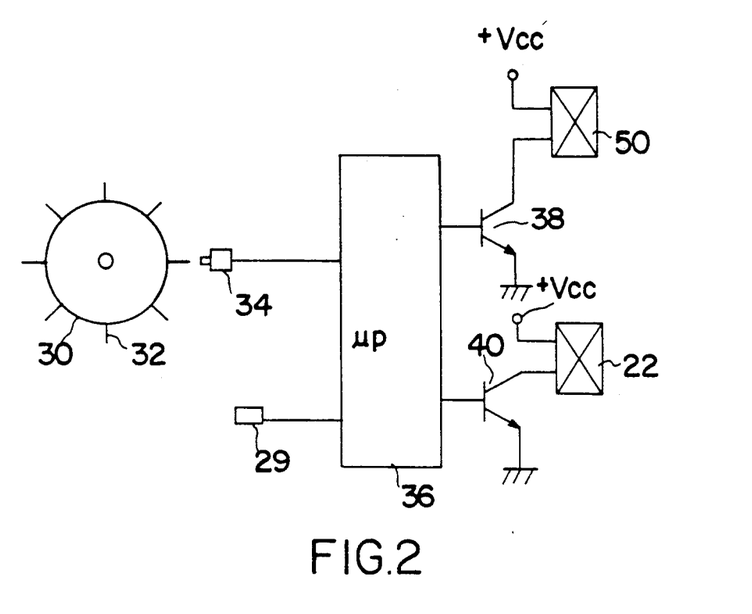
FIG. 2 is a schematic diagram illustrating an engine speed detecting means.

A detailed explanation will now be given with reference to FIGS. 2 and 3. As shown in FIG. 2, a distributor 30 synchronized with the rotation of the engine 6 is provided with a plurality of equally spaced, projecting pawls 32 facing on a pulser, substantially a magnetic pickup 34. Therefore, the time interval between pawls 32 of the distributor obtained from the magnetic pickup 34 differs depending on the number of revolutions of the engine 6. Once a time T between pawls 32 of the distributor 30 is obtained by the magnetic pickup 34 (see STEP1 in FIG. 3), a signal associated with the time T is received by a microprocessor 36, which calculates the number of revolutions per minute of the engine 6 on the basis of the time T (STEP2 in FIG. 3).

Figure 3:
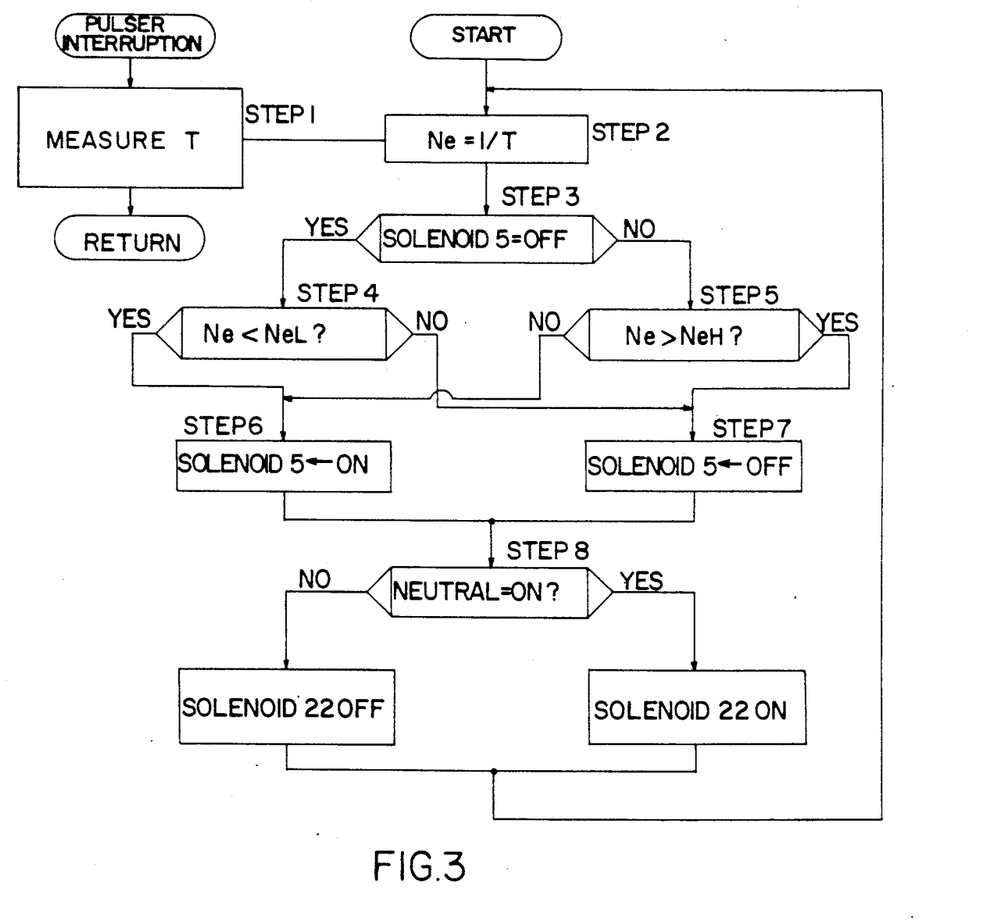
FIG. 3 is a flow chart of the system embodying the invention.

The microprocessor 36 then determines whether the solenoid 5 is ON or OFF (STEP3 in FIG. 3). If the solenoid valve 5 is ON, it is closed, while when it is OFF, it is open.

When the solenoid valve 5 is OFF, i.e., when it is open and the number of revolutions is either above 2,000 rpm or is decreasing from 2,000 rpm down to 1,925 rpm, a determination is made as to whether or not the number of revolutions per minute, Ne, of the engine 6 is below $Ne_L$, namely, below 1,925 rpm (STEP4 in FIG. 3).

If the answer is affirmative, the solenoid valve 50 is energized into a closed state or ON, whereby the supply of air from the communication pipe 14e is stopped (STEP6 in FIG. 3).

Actually, a signal for rendering a transistor 38 conductive is provided from the microprocessor 36 to energize the solenoid valve 50, whereby the valve 5 is turned ON, i.e., closed. Consequently, only a small amount of secondary air is fed to the intake pipes 2, 2 through the bypass pipe 14c.

On the other hand, when in STEP3 the solenoid valve 50 is ON, i.e., when it is closed and the number or revolutions is either below 1,925 rpm or is increasing from 1,925 rpm to 2,000 rpm, a determination is made as to whether or not the number of revolutions per minute, Ne, of the engine 6 is above $Ne_H$, say 2,000 rpm (STEP5 in FIG. 3). If the answer is affirmative, the solenoid valve 50 turns OFF, assuming its open state, so that the upstream side of the communication pipe 14b and the downstream side thereof with respect to the solenoid valve 50 come into communication with each other (STEP7 in FIG. 3). More specifically, the signal for keeping the solenoid valve 50 ON is no longer provided to the transistor 38 from the microprocessor 36, thus causing the valve 50 to open. Consequently, air is supplied to the intake pipes 2,2 from both the communication pipe 14b and the bypass pipe 14c, and so the engine 6 rotates under a high pressure at a relatively low fuel concentration of the air-fuel mixture.

Where the rpm, Ne, of the engine 6 is higher than $Ne_L$ in STEP4, execution passes to STEP7, while when the rpm, Ne, of the engine 6 is lower than $Ne_H$ in STEP5, execution passes to STEP6.

Thus, at start-up of the engine 6, only a small amount of secondary air is supplied through the bypass pipe 14c regardless of variations in negative pressure up to sufficiently high revolutions of 2,000 rpm, so that the air-fuel mixture of a high fuel concentration is fed to the engine 6, thus facilitating start-up of the engine. Where engine brake is applied during continuous operation, secondary air is supplied in response to negative pressure, as in the prior art, until the number of revolutions of the engine 6 decreases to below 1,925 rpm, then further decrease of the engine speed below 1,925 rpm, the amount of the secondary air supplied decreases to a small amount through only the bypass pipe 14c, regardless of variations in negative pressure. Therefore, it is possible to eliminate response delays upon application of engine brake, as in the foregoing conventional system.

A determination is then made as to whether or not the neutral switch indicating a neutral state, N, of the vehicle is ON (STEP8 in FIG. 3). Then, execution returns to STEP2 regardless of whether the neutral switch is ON or OFF. More specifically, when the neutral switch 29 is ON in a neutral state, the microprocessor 36 receives that signal and renders a transistor 40 conductive, so that the solenoid valve 220 in the negative pressure detector 15 opens to equalize the pressures in chambers A and B. Consequently, the secondary air one-shot air valve 4 becomes inoperative to stop the supply of secondary air, with the result that the increase or decrease of the engine speed through operation of the accelerator is improved.

Moreover, even when the solenoid valve 50 is closed at an engine speed below 1,925 rpm, a very small amount of air is supplied to the intake pipe 2 through the orifice 14d provided in the bypass pipe 14c, thus preventing misfiring at the time of sudden increase of negative pressure.

Figure 4:
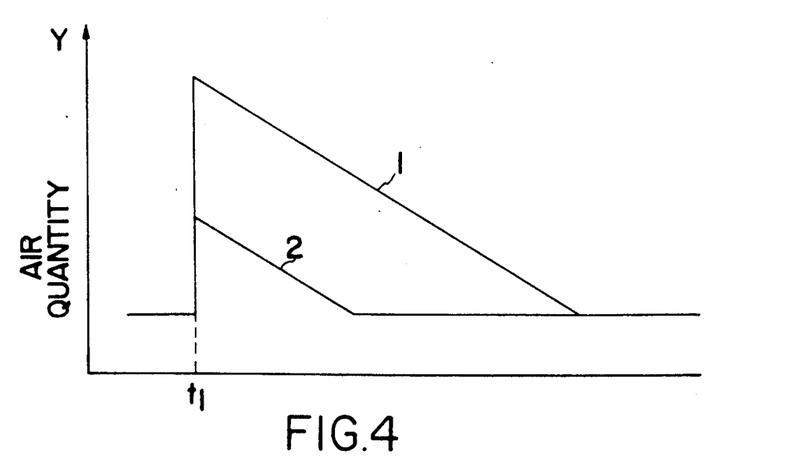
FIG. 4 is a diagram explanatory of the amount of secondary air supplied.

FIG. 4 shows changes in the supply of secondary air on the downstream side of the secondary air one-shot air valve 4. In FIG. 4, the ordinate and abscissa axes represent the amount of air supplied and time, respectively, the curves 1 and 2 indicate changes in the amount of secondary air supplied in open and closed conditions, respectively, of the solenoid valve 50, and $t_1$ indicates an operation time of the valve 50.

Further, the one-way valve 23 located downstream of the solenoid valve 50 and bypass pipe 14c permits air to flow only in the direction of the intake pipe 2 from the air cleaner 1 as indicated by arrow in FIG. 1, thus preventing the air-fuel mixture in the internal combustion engine from flowing toward the air cleaner through the intake pipe 2 and communication pipes 14a, 14b.

Figure 5:
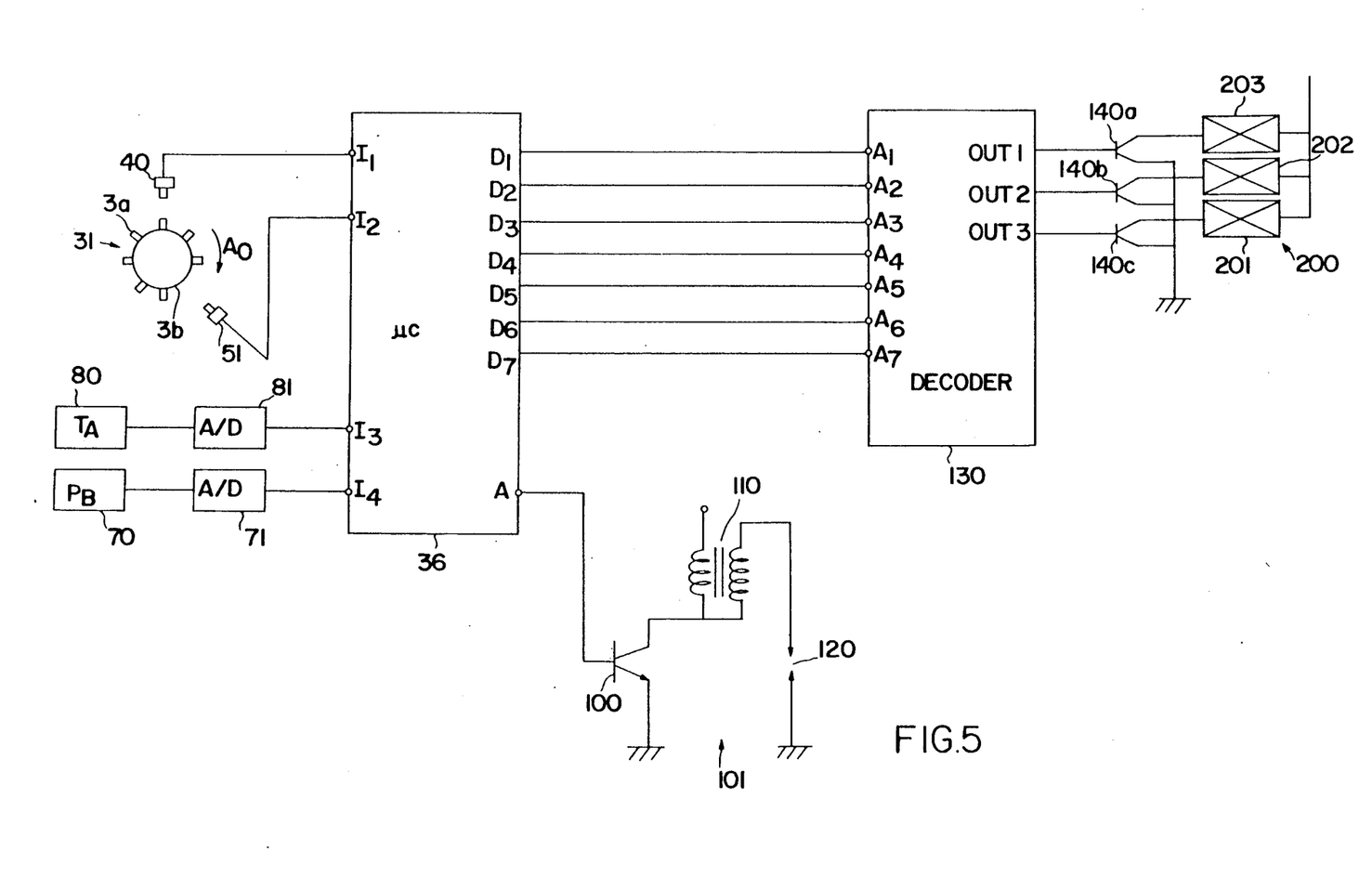
FIG. 5 is a block diagram of illustrating an embodiment of the present invention.

FIG. 5 is a block diagram of an embodiment of the present invention. As is apparent from this figure, a vehicular control circuit according to this embodiment comprises an ignition control circuit and an air supply control circuit, both for an internal combustion engine.

In the figure, the numerals 101 and 200 denote an ignition circuit and a solenoid valve for the supply of air, respectively. A rotor 31 is mounted on a crank shaft of the internal combustion engine or a shaft which rotates in synchronism with the crank shaft. On the outer periphery of the rotor 31, there are disposed seven pawls 3a at intervals of 45 degrees, except one region 3b.

First and second pulsers 40 and 51 are sensors for detecting the passage of the pawls 3a, which sensors are disposed near the outer periphery of the rotor 3. Therefore, when the rotor 31 rotates in the direction of arrow A0, the second pulser 51 detects a pawl 3a at an earlier timing than the pulser 40. Output lines from the first and second pulsers 41 and 51 are connected to input terminals $I_1$ and $I_2$ of a microprocessor $6^1$ provided with a CPU and a memory.

A pressure sensor 70 is disposed in a suitable position of an intake pipe (see FIG. 5) of the internal combustion engine to detect an internal pressure $P_B$ of the intake pipe. A temperature sensor 80 is disposed in a suitable position of the exterior of the vehicle body to detect an outside air temperature $T_A$. Output lines of the pressure sensor 70 and temperature sensor 80 are connected to input terminals $I_4$ and $I_3$ of the microprocessor 36 through A/D converters 81 and 81, respectively.

An output terminal A of the microprocessor 86 is connected to the base of a transistor 100 in the ignition circuit 101, which is of a transistor type. In the ignition circuit 101, the numerals 110 and 120 denote an ignition coil and an ignition plug, respectively. Other output terminals $D_1$-$D_7$ of the microprocessor 36 are connected to addressing terminals $A_1$-$A_7$ of a memory 130. The output terminals $D_1$-$D_7$ provide detected signals on vehicular running conditions of engine speed Ne, pressure $P_B$ and outside air temperature $T_A$, as binary codes correlated according to a certain partition. This point will be described below in more detail.

A ROM is used as the memory 130 and at addresses specified by signals ($D_1$-$D_7$) there are stored, for example, 3-bit control signals. The control signals are read out by addressing the corresponding storage location and the bit contents thereof are provided from output terminals OUT1-OUT3. The output terminals OUT- 1-OUT3 are connected to the bases of switching transistors 140a, 140b and 140c for driving solenoid valves 201, 202 and 203, respectively, so that the solenoid valves 2a, 2b and 2c are turned ON or OFF according to the digits (1 or 0) of each bit of the signal stored in the memory 130.

Figure 6:
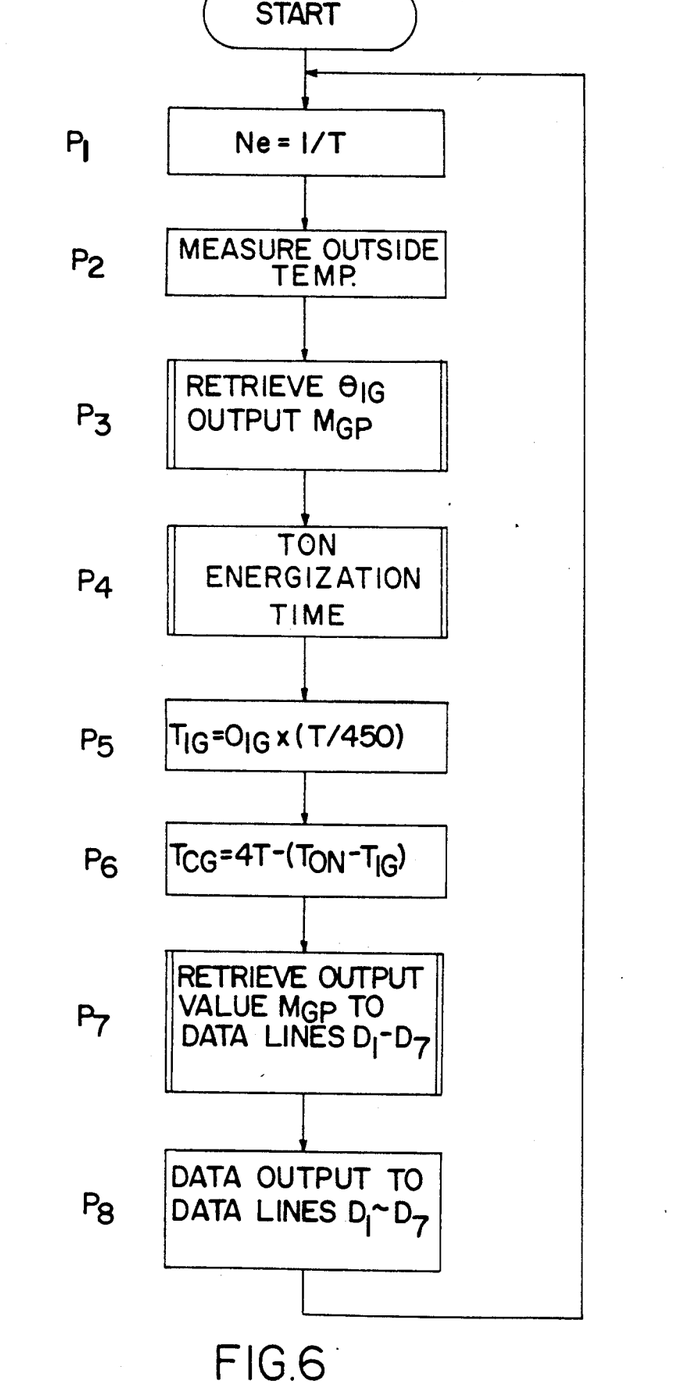
FIG. 6 is a flow chart showing a main routine of a microprocessor
Figure 7:
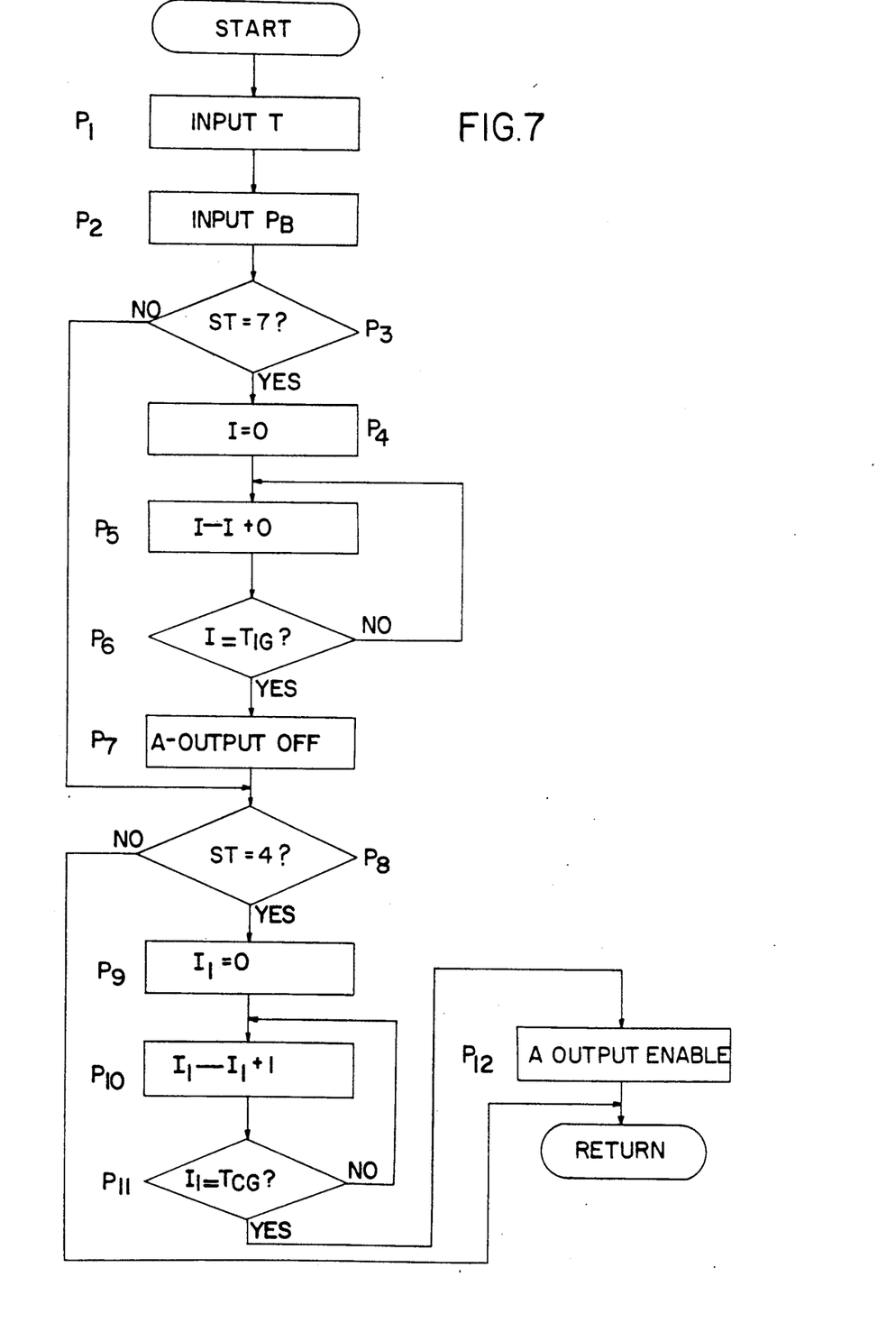
FIG. 7 is a flow chart showing an interruption routine.

Under the above construction, the operation of the microprocessor will be described below. FIG. 6 is a flow chart showing a main routine of the microprocessor; FIG. 7 is a flow chart showing an interruption routine; and FIG. 8 shows an example of a timing chart.

Before explaining the flow charts, a brief explanation will now be given with reference to FIG. 8 about setting an energization start timing for the ignition coil 110 and an ignition timing which is performed by the microprocessor 36. The stage number ST in FIG. 8 is set at every output of a first pulse. In this embodiment, 1 to 7 stage numbers are set every time the rotor 31 rotates once. It is here assumed that the energization start stage is set at 4. First and second pulses indicate detected signals of pawls 3a by the first and second pulsers 40 and 51. The output from the output terminal A of the microprocessor 36 controls on-off operation of the transistor 100, resulting in control of the energization time for the ignition coil 110 and the ignition timing of the ignition plug 120. In the following description, the energization time for the ignition coil 110, i.e, the time period during which there is an output (hereinafter referred to as "A-output") from the terminal A of the microprocessor 36, will be designated an energization time TON.

Figure 8:
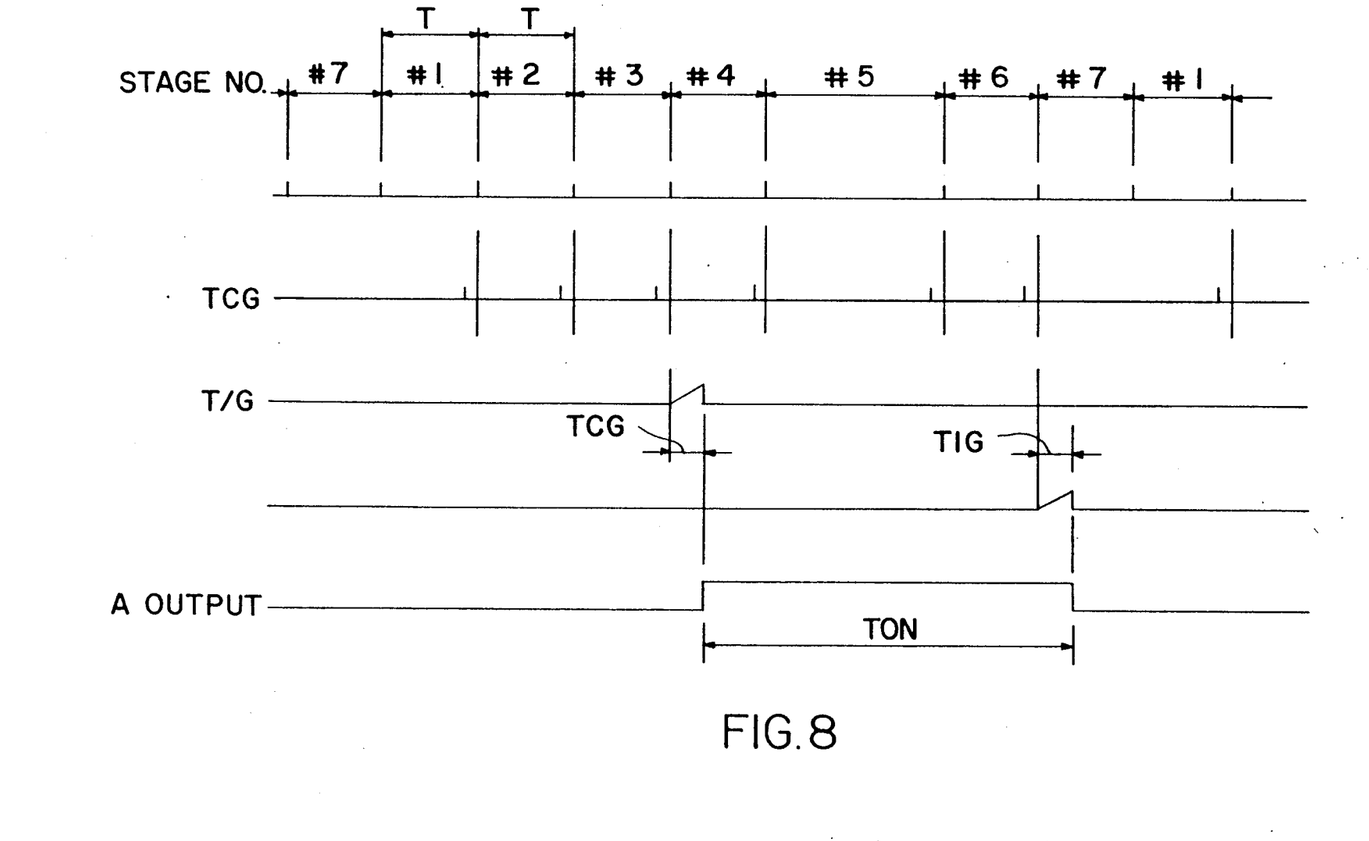
FIG. 8 is a timing chart.

As is apparent from FIG. 8, the start of a signal from the A-output is when time TCG has elapsed from the start of the fourth stage, while the end of a signal from the A-output is when time TIG has elapsed from the start of the seventh stage. The TIG and TCG are calculated by the main routine of the microprocessor as shown in the flow chart of FIG. 6, and the on-off operation of the transistor 100 is processed by the interruption routine of FIG. 7. These flow charts will be explained below.

Upon turning ON of an ignition switch (not shown), the starter turns, the rotor 31 rotates in the direction of arrow A0, and at the same time the processing shown in FIG. 6 is started. During this processing, the interruption routine of FIG. 7 is executed at every generation of an output pulse (hereinafter referred to as the "first pulse") from the first pulser 40.

Upon start-up of the main routine, time T is input and the engine speed Ne is calculated as the reciprocal of T, in step P1 (step Pn will hereinafter be referred to simply as step n). In this embodiment, the time T represents a time period from the time point of generation of the first pulse mentioned above, up to the generation of the next first pulse. For example, it is measured through counting of clock pulses by means of an internal counter provided in the microprocessor 36.

Then, in step 2, an outside temperature is input from the temperature sensor 80. Next, in step 3, $\theta$IG for the calculation of time TIG is set by retrieval of a $\theta$IG output table retrieving table and a $\theta$IG output table. The $\theta$IG represents a rotational angle of the crank shaft from the start of the seventh stage until the lapse of time TIG. The rotational angle $\theta$IG takes a value which is determined with the engine speed Ne (i.e., time T) and intake pipe pressure $P_B$ as parameters.

The $\theta$IG output table retrieving table comprises a plurality of $\theta$IG output tables set with the engine speed Ne (i.e., time T) as a parameter. It is stored in the memory of the microprocessor 36.

When the processing of step 3 is over, then in step 4, an energization time TON (FIG. 8) is read from a TON output table. The energization time TON takes a value which is determined with time T as a parameter.

In the TON output table there are set energization times TON with the engine speed Ne (i.e., time T) as a parameter. It is stored in the memory of the microprocessor 36 like the foregoing $\theta$IG output table retrieving table and the $\theta$IG output table.

When the processing of step 4 is over, TIG (FIG. 8) is calculated in step 5 from both the rotational angle $\theta$IG read out in step 3 and time T indicative of an output interval of the first pulses which time T was input in the above step 1 or in step 1 of the interruption routine (FIG. 7). This calculation can be done according to the numerical expression shown in the block of step 5.

Next, in step 6, TCG (FIG. 8) is calculated according to the numerical expression shown in the block of step 6 using the energization time TON read out in step 4, the TIG calculated in step 5 and the aforementioned time T.

Then, in step 7, in order that the outside temperature $T_A$, pressure $P_B$ and engine speed Ne which have been input to the microprocessor 36 may be coded in accordance with a later-described conversion table, their corresponding codes ($D_1$-$D_7$) are set by retrieval of the retrieval table and output table and are outputted from the output terminals $D_1$-$D_7$. Thereafter, execution returns to step 1.

The interruption routine shown in FIG. 7 will be explained below. This interruption routine is executed at every output of the first pulse as previously noted.

First, in step 1, time T is input like step 1 (FIG. 7).

Then, in step 2, the intake pipe internal pressure $p_B$ is input from the pressure sensor 70 (FIG. 5).

In step 3, a determination is made as to whether or not the stage number ST is 7, i.e., whether or not it is the ignition stage (seventh stage). If the answer is negative, execution passes to step 8, while if the answer is affirmative, execution passes to step 4.

The processing of steps 4 to 7 is for letting the processing of the sub-routine stand by during the period from the start of the seventh stage until the lapse of time TIG. More specifically, in step 4, a clock pulse counter (indicated as a second counter in FIG. 8) incorporated in the microprocessor 36 is reset, i.e., the count value I is set to 0, then in steps 5 and 6, the above clock pulse is produced, and every time 1 is added to the count value, a comparison is made between the elapsed time (i.e., I) and TIG. And when the count value I has exceeded TIG from the start of the seventh stage, then in step 7, the output of the microprocessor 36 turns OFF and the ignition plug 120 discharges.

In step 8, a determination is made as to whether or not the stage number ST of the stage concerned corresponds to a preset energization start stage number CS (here, 4), i.e., whether or not it is the energization start stage for the ignition coil. If the answer is negative, the processing of this interruption routine is over, while if the answer is affirmative, execution passes to step 9.

The processing of steps 9 to 12, like the processing of steps 4 to 6, is for letting the processing of this subroutine stand by until the lapse of time TCG from the start of the energization start stage. The counter for counting the time from the start of the energization start stage until the lapse of time TCG is shown as the first counter in FIG. 8.

When the time TCG has elapsed from the start of the energization start stage, then in step 12, the A-output of the microprocessor 36 turns ON and the energization to the ignition coil 110 is started.

The following description relates to coding of the data Ne, $P_B$ and $T_A$ which are output values of the output terminals $D_1$-$D_7$ of the processor 36, and also to driving the solenoid valve which is the second control object.

Figure 9:
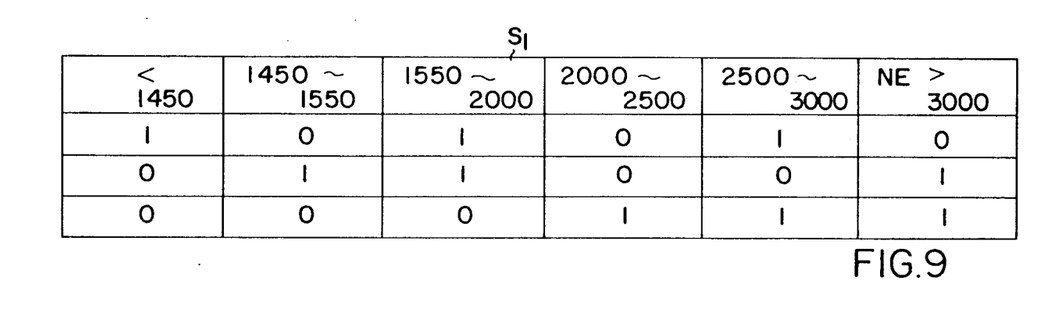
FIG. 9 is a code conversion table for engine speed.
Figure 10:
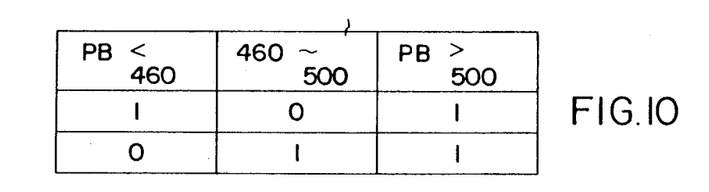
FIG. 10 is a code conversion table for intake pipe pressure.
Figure 11:
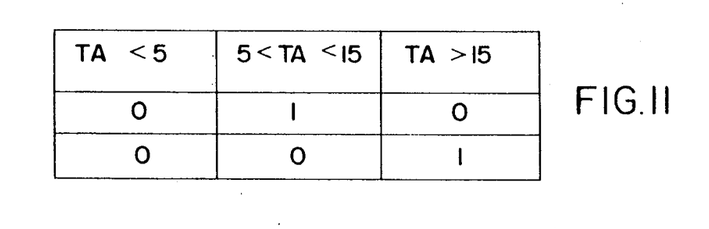
FIG. 11 is a code conversion table for outside air temperature.

The engine speed Ne, pressure $P_B$ and outside temperature $T_A$ are converted to binary signals of three digits ($D_1$-$D_3$), two digits ($D_4$, $D_5$) and two digits ($D_6$, $D_7$) according to the conversion tables shown in FIGS. 9 to 11, and there are determined output values of $D_1$-$D_7$. More specifically, as to the engine speed Ne, the values of ($D_1$, $D_2$, $D_3$) are determined from FIG. 9 as (1, 1, 0) in the engine speed range of $1550 < Ne < 2000$ (S1). As to the pressure $P_B$, the values of ($D_4$, $D_5$) are determined from FIG. 10 as (0, 1) in the pressure range of $460 < P_B < 500$ (S2). Further, as to the outside temperature $T_A$, the values ($D_6$, $D_7$) are determined in the same manner from FIG. 11.

The output signals thus determined from the output terminals $D_1$-$D_7$ are fed to the address terminals $A_1$-$A_7$ of the memory 36 and the data of the control signals stored in the addresses are read out. The control signals are binary signals of three bits as mentioned above, which bits function to open or close the first to third solenoid valves 201, 202 and 203.

Figure 12:
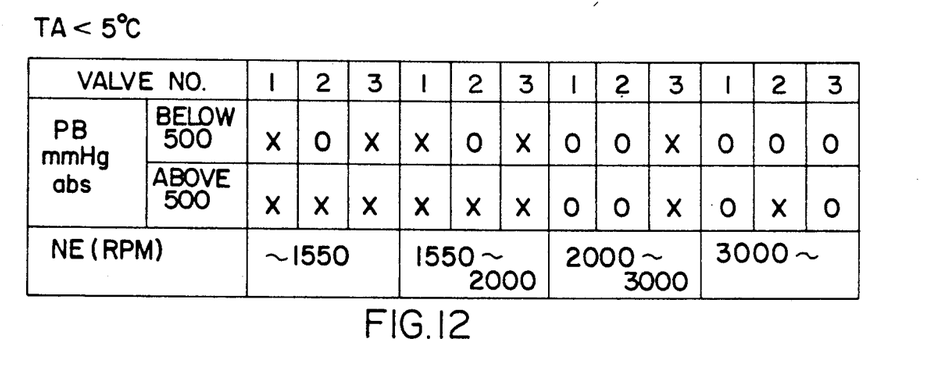
FIGS. 12 to 14 are tables showing control contents.
Figure 13:
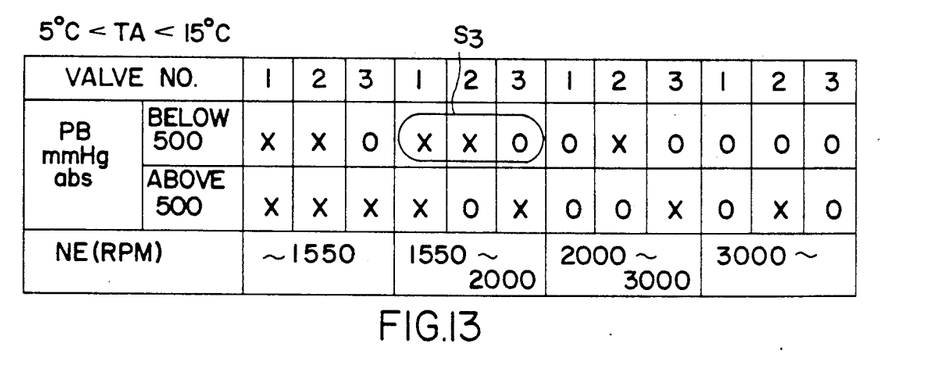
Figure 14:
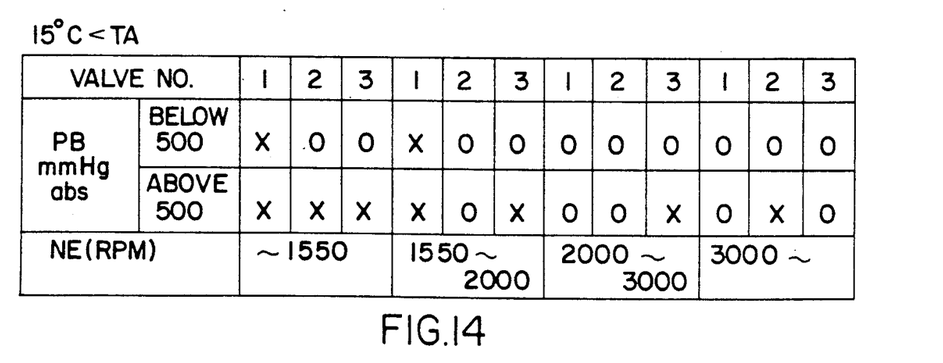

The contents of these control signals are shown in the Tables of FIGS. 12 to 14. In each of these tables, values of the outside temperature $T_A$ are classified into three ranges of $T_A < 5°$ C., $5°$ C. $< T_A < 15°$ C. and $15°$ C. $< T_A$. These correspond to the cases of (0, 0), (1, 0) and (0, 1) in terms of values ($D_6$, $D_7$) in FIG. 11. In each table, a total of eight divisions are made, including four divisions according to values of the engine speed and two by two division s according to values of the pressure $P_B$. In each of the divisions, there are decided ON/OFF drives (O/X marks), i.e., control signals (3-bit data), for the first to third solenoid valves $2a^1$, $2b^1$ and $2c^1$.

Thus, according to the tables shown in FIGS. 9 to 14, for example when the engine speed Ne is $1550 < Ne < 2000$, the pressure $P_B$ is $P_B > 500$ and the outside temperature $T_A$ is $T_A > 15$, the signals of $D_1$ to $D_7$ are (1, 1, 0, 1, 1, 1, 0), and it is seen from the partition (S3) (X, X, O) that the data signals at the address values concerned are (0, 0, 1). It is therefore understood that at this time control is made so that the first and second solenoid valves 2a and 2b are closed and the third solenoid valve 2c is opened.

The output values $D_1$-$D_7$ are given hysteresis so as not to vary frequently at the boundary of adjacent partitions. For example, the engine speed Ne, pressure $P_B$ and outside temperature $T_A$ are given hysteresis of 75 rpm in a low rotational direction, 10 mmHg in a vacuum direction and 1° C. in a low temperature direction.

Thus, according to this embodiment, control conditions for the solenoid valves as the second control object can be changed merely by replacing the memory 130 or by rewriting its contents. Consequently, it is possible to respond easily and quickly with a change of a control value.

Figure 15:
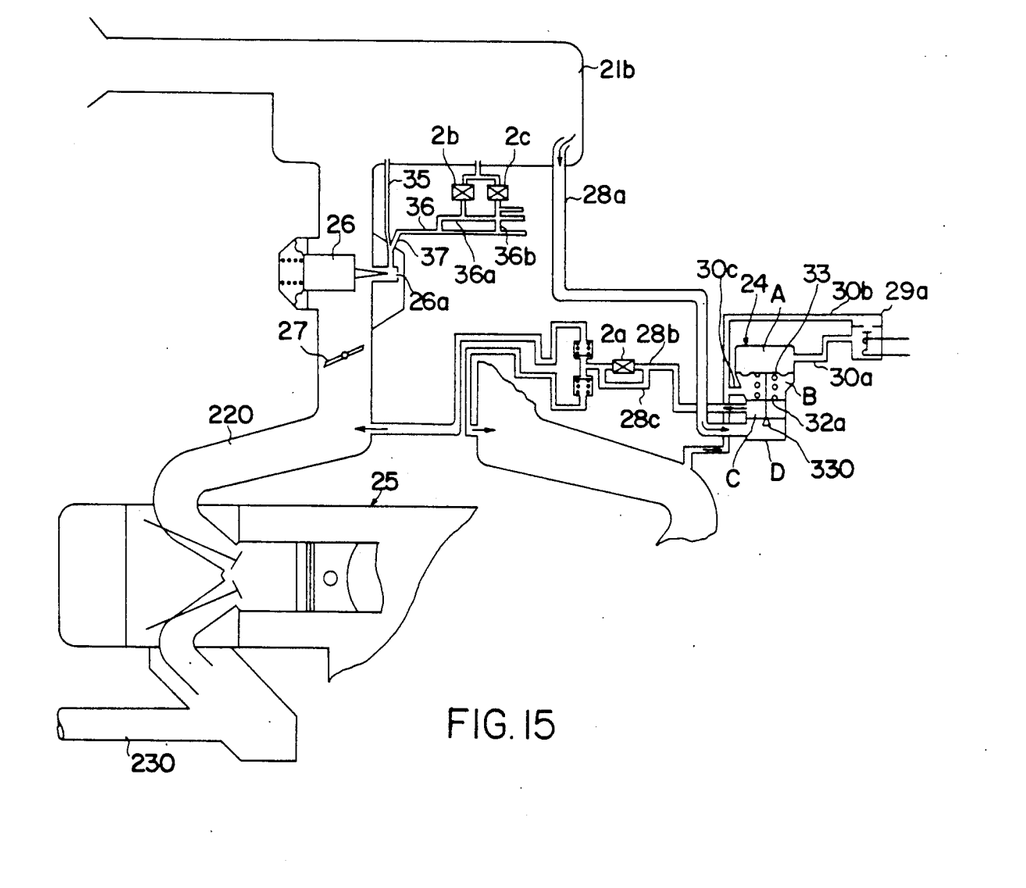
FIG. 15 illustrates solenoid valves.

With reference to FIG. 15, which illustrates the surrounding portion of the internal combustion engine, the following description is provided about the mounting positions and operations of the solenoid valves 2a, 2b and 2c as the second control object in this embodiment.

In FIG. 15 the numerals 21b, 220, 230, 24 and 25 denote an air cleaner, an intake pipe, an exhaust pipe, a secondary air one-shot air valve, and an internal combustion engine, respectively. In the interior of the intake pipe 220 there is provided a carburetor 26, and a throttle valve 27 is disposed below the carburetor 26.

The secondary air one-shot air valve 24 is in communication with an air cleaner 21b and intake pipes 220 through communication pipes 28a and 28b, and is also in communication with one intake pipe 220 through a negative pressure detector 29a and through communication pipes 30a, 30b, 30c.

Further, the secondary air one-shot air valve 24 is divided into chambers A, B, C and D by a diaphragm 33, a partition wall 32a and a valve 330, the chamber C being connected to the communication pipe 28b located downstream. The first solenoid valve 2a is provided in an intermediate position of the communication pipe 28b. Disposed in parallel with the communication pipe 28b is a bypass pipe 28c.

The first solenoid valve 2a functions to close only one pipe 28b of the pipes 28b and 28c to thereby adjust the amount of secondary air supplied from the secondary air one-shot air valve 24 in a gradually decreasing manner, thereby preventing engine brake from becoming less effective due to secondary air.

Air passages 35 and 37 for the supply of air to adjust the fuel-air mixing ratio are open to a primary jet 26a of the carburetor 26. The air passage 35 is normally open to permit the supply of a constant amount of air, while the other air passage 36 is branched halfway on its upstream side into air passages 36a and 36b, in which are provided the second and third solenoid valves 2b and 2c.

The solenoid valves 2b and 2c function to open to supply a larger amount of air, thereby increasing the proportion of air relative to fuel. Therefore, when the engine is low in temperature, for example, at the time of engine start-up, the solenoid valves are generally closed to reduce the proportion of air relative to fuel, while when the intake pipe pressure is high, for example at high revolutions of the engine, the solenoid valves 2b and 2c are opened to increase the proportion of air.

Thus, the control for the first to third solenoid valves 2a, 2b and 2c requires a lot of data on vehicular running conditions such as the engine speed Ne, intake pipe pressure $P_B$ and outside temperature $T_A$. But in this embodiment of the present invention, those data are used in common with the control for the ignition circuit as another control object which requires the data. This is advantageous in that the wiring is reduced and the entire circuitry becomes compact, thus leading to reduction in cost.

Although an embodiment of the present invention has been described above, the invention is not limited thereto. For example, although the code conversion circuit is constituted using a memory, it may be constituted using a logic circuit. Further, the control objects are not limited to the ignition control circuit and air supply control circuit. Any two or more control objects are utilizable effectively so long as they use many data in an overlapped manner.

Thus, according to the present invention, there can be provided a secondary air supply system including a secondary air one-shot air valve, air passages formed in parallel and downstream of the air valve, and a solenoid valve provided in one of the air passages, the solenoid valve functioning to decrease the amount of secondary air to be supplied to intake pipes at an engine speed below a predetermined value during application of engine brake, whereby at an engine speed below such predetermined value the internal combustion of the engine can be suppressed to enhance the effect of the engine brake.

Also, as will be apparent from the foregoing description, the invention uses a CPU in common for two or more kinds of control circuits to thereby reduce the number of overlapped components and attain a compact configuration of the control circuits, thereby reducing the cost of the circuits. Further, a change of a control value can be accomplished by merely changing the code conversion circuit. Consequently, the invention provides a vehicular control circuit capable of easily coping with changes in control values.

What is claimed is:

1. A control circuit for a vehicle, comprising a first control circuit for driving a first control object in accordance with detected signals on running conditions of the vehicle, and a second control circuit for driving a second control object different from the first control object, said first control circuit including a microcomputer to drive said first control object, and said detected signals being coded by said microcomputer, and said second control circuit being a code conversion circuit for converting a set of values of said detected signals coded by said microcomputer into driving signals for said second control object, said code conversion circuit comprising said memory using as addresses a set of values of said detected signals coded by said microcomputer, said memory storing driving signals for said second control object at said addresses.

2. A control circuit for a vehicle according to claim 1, wherein said first control object is an ignition control circuit for an internal combustion engine, and said second control object is an air supply control circuit for the internal combustion engine.

3. A control circuit for a vehicle according to claim 2, wherein said code conversion circuit is a memory using as addresses a set of values of said detected signals coded by said microcomputer, said memory storing signals for said second control object at said addresses.

4. A control circuit for a vehicle according to claim 2, wherein a data divisional point of said code conversion circuit has a hysteresis characteristic.

5. A control circuit for a vehicle according to claim 1, wherein a data divisional point of said code conversion circuit has a hysteresis characteristic.

6. A control circuit for a vehicle internal combustion engine comprising:
a plurality of sensors for sensing an engine speed, an outside air temperature and an internal operating pressure for said vehicle engine;
an ignition circuit for said vehicle engine;
a microcomputer connected to receive signals from said plurality of sensors, and to provide a set of signals for controlling a secondary air supply system, and a signal for controlling said ignition circuit; and,
a memory circuit for receiving said set of signals from said microcomputer and producing in response thereto control signals for said secondary air supply system.

7. The control circuit of claim 6 wherein said secondary air supply system comprises:
a secondary air one-shot air valve;
a pair of air passages in parallel, connected at one end to said air shot valve and to an opposite end to said internal combustion engine;
a solenoid valve in one of said parallel air passages, said solenoid valve being opened and closed in response to a sensed value of said engine speed, said outside air temperature and said internal pressure of said vehicle engine.

8. The control circuit of claim 7 wherein said secondary air supply comprises a second pair of parallel air passages connected to said internal combustion engine, each being connected to a pair of solenoid valves operated in response to data produced by said memory.

* * * * *